United States Patent
Kumar et al.

(10) Patent No.: US 9,661,458 B2
(45) Date of Patent: May 23, 2017

(54) METHOD FOR ASSOCIATING WIRELESS SENSORS TO PHYSICAL LOCATIONS

(71) Applicant: THE BOEING COMPANY, Huntington Beach, CA (US)

(72) Inventors: Anil Kumar, Sammamish, WA (US); Guangyu Pei, Issaquah, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/816,514

(22) Filed: Aug. 3, 2015

(65) Prior Publication Data
US 2017/0041739 A1    Feb. 9, 2017

(51) Int. Cl.
| | | |
|---|---|---|
| *H04Q 5/22* | (2006.01) |
| *H04W 4/02* | (2009.01) |
| *G06K 7/10* | (2006.01) |
| *H04W 84/18* | (2009.01) |

(52) U.S. Cl.
CPC .......... *H04W 4/02* (2013.01); *G06K 7/10366* (2013.01); *H04W 84/18* (2013.01)

(58) Field of Classification Search
CPC ..... H04W 4/02; H04W 84/18; G06K 7/10366
USPC ....................................................... 340/10.1
See application file for complete search history.

(56) References Cited

U.S. PATENT DOCUMENTS

| | | | |
|---|---|---|---|
| 2005/0248454 A1* | 11/2005 | Hanson | G06Q 10/087 340/539.26 |
| 2010/0060050 A1 | 3/2010 | Muirhead | |
| 2012/0015665 A1* | 1/2012 | Farley | G01S 5/0036 455/456.1 |
| 2015/0058473 A1 | 2/2015 | Grande | |
| 2016/0209604 A1 | 7/2016 | Sherer et al. | |

FOREIGN PATENT DOCUMENTS

| | | |
|---|---|---|
| CN | 102325345 A | 1/2012 |
| CN | 104680213 A | 6/2015 |
| JP | 2005190160 A * | 7/2005 |
| WO | 2014042742 A1 | 3/2014 |

OTHER PUBLICATIONS

Webpage "MAC address—Media Access Control Address" from http://webopedia.com/TERM/M/MAC_address.html Jun. 13, 2015.

(Continued)

*Primary Examiner* — Tanmay Shah
(74) *Attorney, Agent, or Firm* — Coats & Bennett, PLLC

(57) ABSTRACT

Mapping the physical location of each sensor of a network of wireless sensors in a configured environment, each sensor being in communication with a server and its database, is achieved by attaching RFID tags to objects in the environment which contain both object-relevant information and the MAC address of sensors proximate to those objects. The locations of the tags on the objects are proxies for the locations of the sensors identified on those tags. By reading the tags and up-loading the read tag information to the database, the association of the sensor and the object is known to the server and can be matched with the configuration of the environment to infer the location of each wireless sensor.

21 Claims, 6 Drawing Sheets

(56) References Cited

OTHER PUBLICATIONS

Webpage "About.com Wireless/Networking; The MAC Address" from http://compnetworking.about.com/od/networkprotocolsip/l/aa062202a.htm Jun. 13, 2015.
Webpage "Radio-frequency Identification" from https://en.wikipedia.org/wiki/Radio-frequency_identification Jun. 13, 2015.
Randa El-Marakby et al., "Enhanced QoS for Real-time Multimedia Delivery over the Wireless Link using RFID Technology", 2006 IEEE International Symposium on Signal Processing and Information Technology, Aug. 1, 2006, pp. 728-734.
Sungjun Kim et al., "Geographical location based RFID tracking system", 2008 International Symposium on a World of Wireless, Mobile and Multimedia Networks, Piscataway.
Extended European Search report for EP Application No. 16182233.3.
Intellectual Property Office of Singapore Search Report and Written Opinion for SG Application No. 10201606188P dated Mar. 7, 2017.

\* cited by examiner

METHOD FOR ASSOCIATING WIRELESS SENSORS TO PHYSICAL LOCATIONS

TECHNOLOGICAL FIELD

The present disclosure relates generally to sensor networks. More specifically, the present disclosure relates to mapping wireless sensors to their physical locations.

BACKGROUND

Arrays of sensors may be deployed over an area or throughout an environment to sense changes in variables within that environment. There are many examples of such arrays, ranging from seismic sensors deployed over a wide geographical area, to safety and security detectors used as part of a home security system, to electrodes attached to the scalp of a patient about to undergo neurological monitoring. The map locations of the sensors in an array may be important because both the amount of a change in a variable and the location where that variable changed may be important, such as in each of the three simple examples given above.

In an enclosed or partially enclosed environment, sensors may be connected by wires or cables to a server that receives their signals. In such an environment, the server knows which sensor is sending a particular signal because the sensor's media access control (MAC) address is part of the message from the sensor and the sensor is linked by a physical wire. However, a MAC address only identifies a specific piece of hardware on a network, hardware electrically connected to the server, but it does not identify its physical location in the normal sense of an address. However, the wire lead runs to the physical location of each sensor. Thus, when setting up a hard-wired network, the physical location of each sensor is confirmed as its wire is run. However, running wires is not always possible. Wireless sensors may be needed instead. An example of where wireless sensors are needed is the first of the three examples given above, when there are seismic sensors deployed over a large area, perhaps one crossed by roads or completely inaccessible by vehicle. Wireless sensors are also preferred when wiring takes up space or adds weight and cost but they still need to be mapped.

An effective way to map the locations of wireless sensors would make it easier to use wireless sensors and thereby speed deployment of them, and obtain the advantages of reduced installation time, costs and material requirements.

BRIEF SUMMARY

The present disclosure describes a network of wireless sensors in an environment, each sensor in communication with a server and its database and mapped for that server to its physical location so the server knows where each sensor is. In that environment, a configuration of objects is established. Radio frequency identification (RFID) tags are attached to those objects and include both information about the objects and also the machine-readable MAC addresses of nearby sensors. The sensors may be attached to surfaces of the same objects as their RFID tags are attached or to those objects having a known relationship with those objects. The physical locations of the sensors can then be determined, or inferred, from the locations of the RFID tags of objects that are assigned locations in the configured environment.

A machine, such as an RFID scanner, reads the RFID tags to obtain both the MAC addresses of the sensors and the location-related information of the associated objects and downloads that information to the server. The server stores the MAC addresses in its database in association with corresponding RFID tag. Thus, the server knows where each sensor is in the environment through the association of unique MAC addresses with particular RFID tags on specific objects assigned to specific locations in the environment dictated by the environment's configuration, so that, if any specific sensor detects a change, the server can respond to that sensor's wireless signal in the appropriate manner.

An aspect of the system, in combination, is a server configured for receiving and processing digital information and wireless signals, a database in communication with that server configured to store and retrieve the information, tags and sensors deployed throughout the environment, each of the tags storing position-related digital information and the identity of nearby sensors that are in wireless communication with the server, the wireless sensors being configured to sense changes in variables and to emit signals upon sensing changes to which the server is programmed to respond, and a machine configured for reading the tags and outputting the information to the server, namely, the position-related digital information and the identities of the wireless sensors, wherein the server stores information and identities in the database so that it can associate the wireless sensors with the positions in the environment in responding to signals from those sensors.

An aspect of the disclosure is the use of radio-frequency identification tags to facilitate storage and transfer of information about the sensors and objects.

Another aspect of the disclosure is that the sensor environment includes a configuration of objects. The configuration of objects is stored in a configuration database and the tags and sensors are deployed in the environment with the objects to which they are attached. The sensors and tags may be on the same object or on different objects but in spaced relationship to a tag on one of the objects.

A particular aspect of the disclosure is that the environment may be the interior of a vehicle such as the cabin of a passenger aircraft and the objects may be a row of passenger seats. Each tag may be attached to a unique row and the sensors may be attached to a unique seat in that row. The tag may store the identities of the sensors for each seat in the row in a pre-determined order such as the seat's position in that row.

Another aspect of the disclosure is a method for setting up a wireless network in an environment. The method includes deploying wireless sensors in the environment, each of the sensors having its own identity in the form of a MAC address and configured to sense a change in that environment and emit a signal related to that change. The signal contains the MAC address. Machine-readable tags are also deployed in the environment. Each tag includes location-related digital information to which the identity of the sensors may be added. The tags are scanned to obtain the location-related digital information and sensor identity. This information is output to the server and stored in the database. The server associates the signals from the wireless sensors with the location-related digital information of the tags and to the identities of the sensors sending wireless signals, and responds as programmed.

Still another aspect of the method includes the steps of configuring the environment, encoding tags with location-related digital information and attaching them to objects in that configuration.

Another aspect of the method of the disclosure is defining a configuration of objects in the environment and using a server to store that configuration. The wireless sensors are attached to the objects that carry the sensors' identities added to the RFID tags on the objects.

The objects contemplated in the present disclosure for the wireless sensor array installed according to the present method include, but are not limited to, vehicles such as, aircraft.

The use of RFID tags to carry sensor information in addition to information about the objects is an advantage because RFID tags are often assigned to objects as a matter of routine quality control to carry information about the manufacture of those objects with the objects, which information is sometimes referred to as the objects' birth records. Adding additional information, here, sensor MAC addresses, ties sensors' identities to that object and the information regarding both can be easily read by an RFID scanner at one time and then associated automatically when loaded to a configuration database. The verification of configuration of the objects by reading the tags thus automatically maps the sensors to the configuration.

In certain environments, such as the interior of a cabin of an aircraft, passenger utilities such as fans, lighting, entertainment, may be controlled by switches that could be position sensors or capacitance sensors so that passengers can operate these utilities from their seats without having hard-wired sensors, thereby saving weight, reducing materials, and simplifying interior design and assembly.

These and other features and their advantages will be apparent to those skilled in the art of sensor mapping from a careful reading of the Detailed Description accompanied by the following drawings.

BRIEF DESCRIPTION OF THE DRAWINGS

Figure 1:
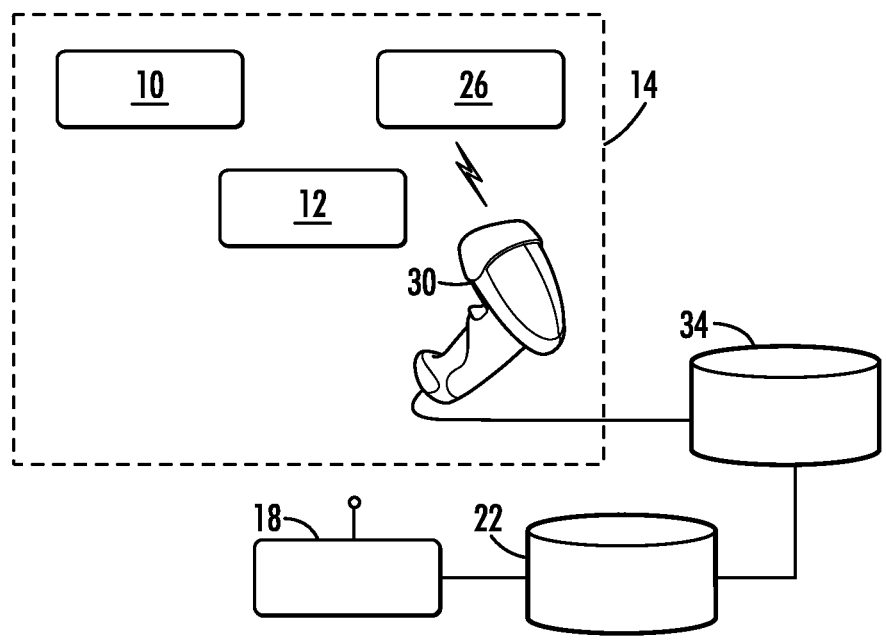
Figure 2:
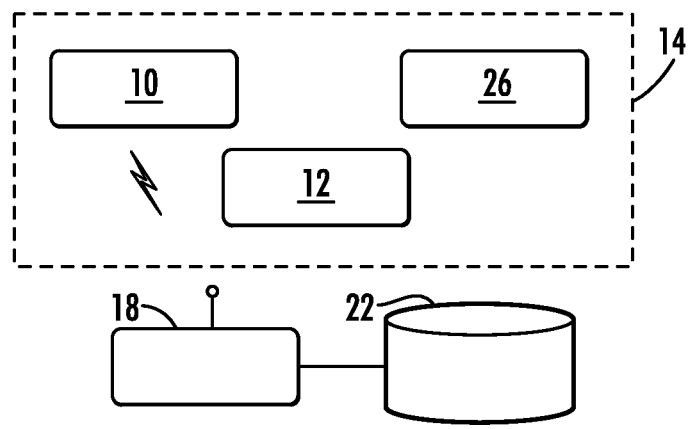
Figure 3:
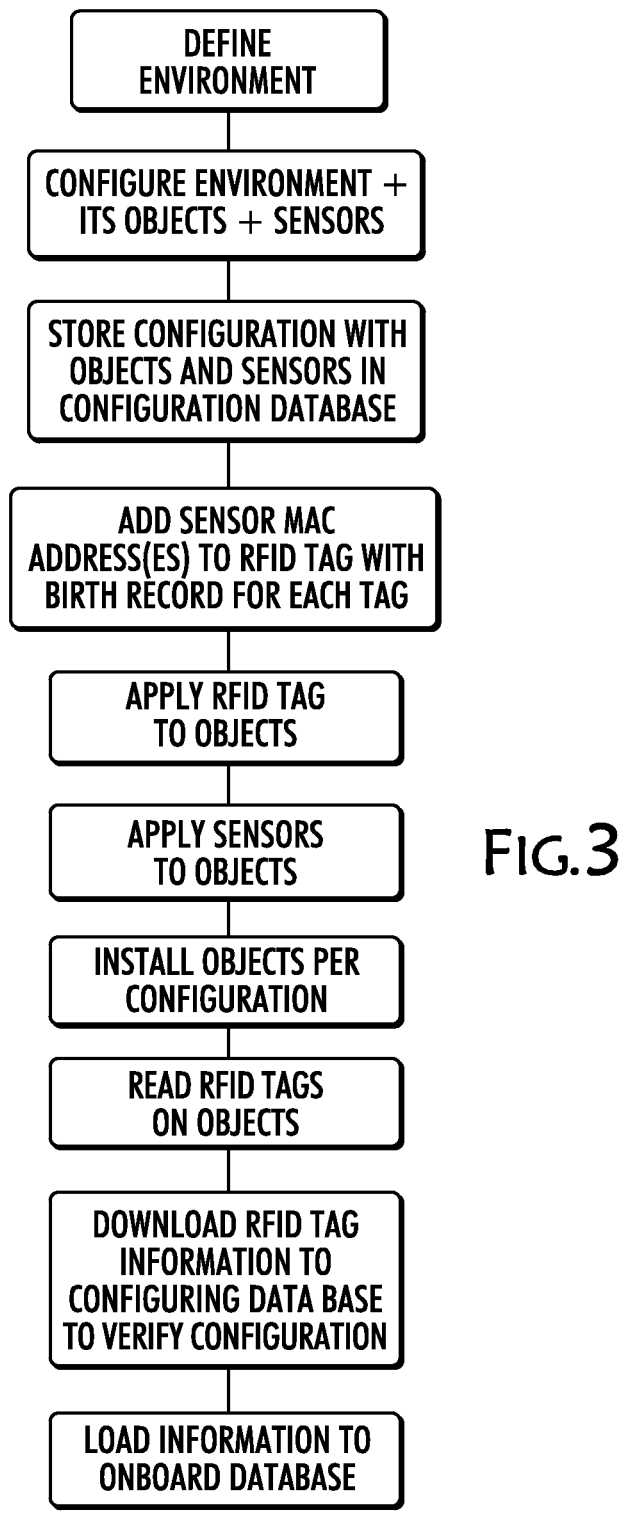
Figure 4:
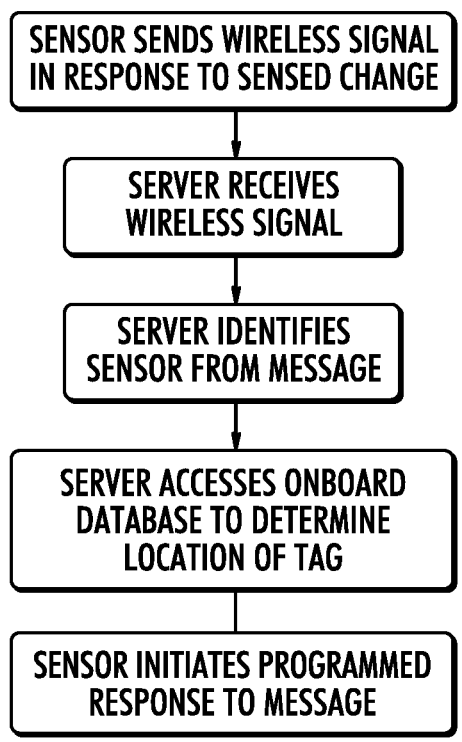

Having thus described variations of the disclosure in general terms, reference will now be made to the accompanying drawings, which are not necessarily drawn to scale, and wherein:

FIG. 1 is a schematic diagram of an aspect of the disclosure illustrating the establishment of the system;

FIG. 2 is a schematic diagram of an aspect of the disclosure illustrating the operation of the system established in FIG. 1;

FIG. 3 is a flow diagram of an aspect of disclosure illustrating the establishment of the present system;

FIG. 4 is a flow diagram of an aspect of the disclosure illustrating the operation of the present system as established in FIG. 3

Figure 5:
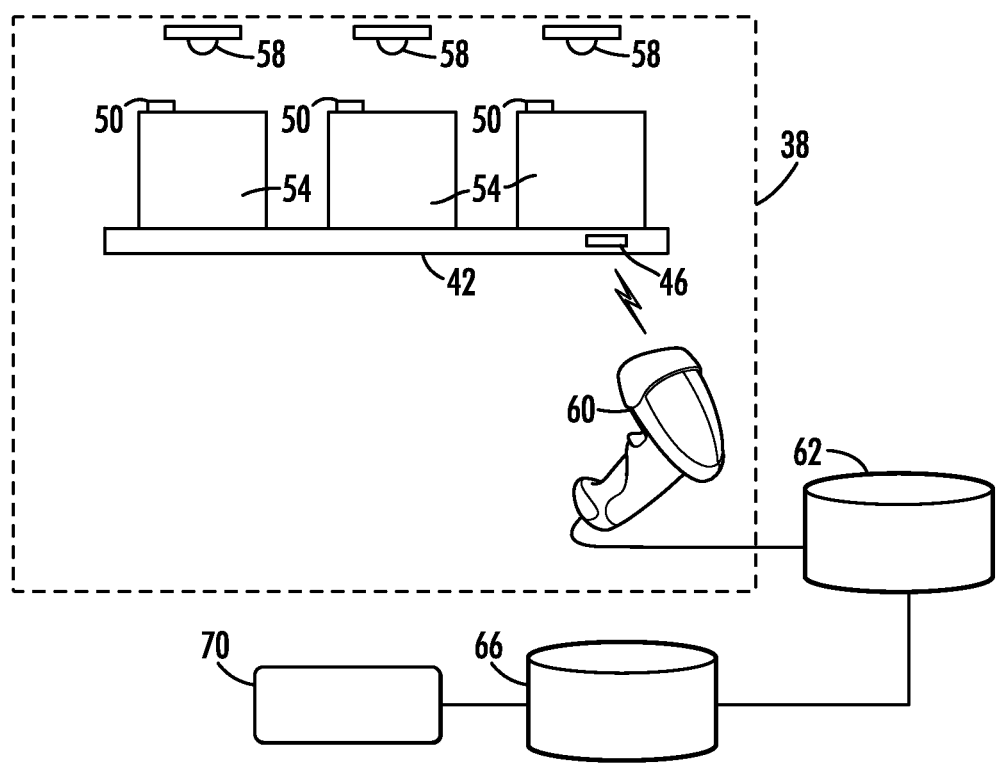
Figure 6:
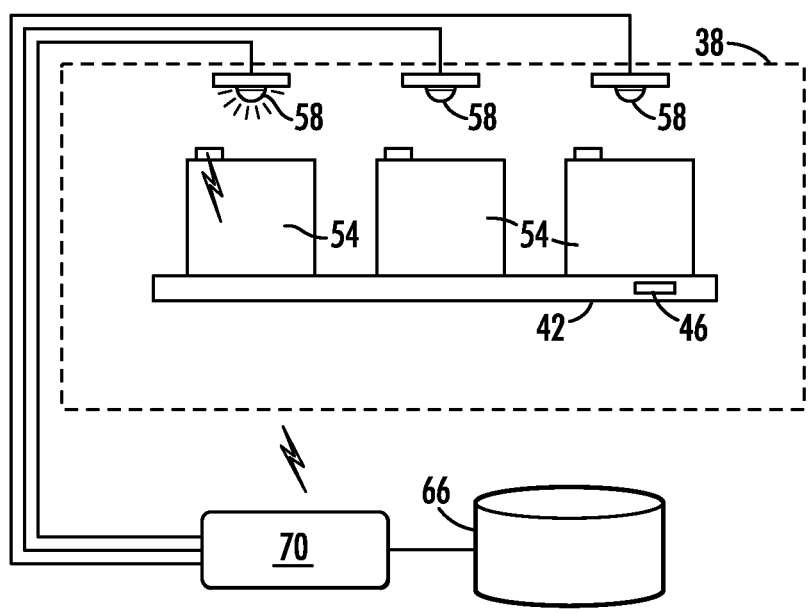
Figure 7:
Figure 8:
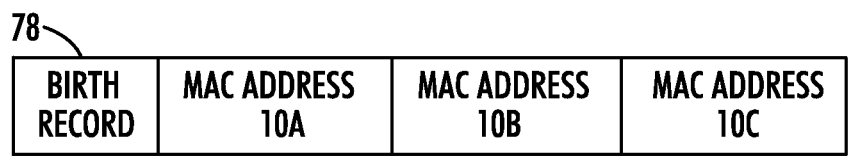

FIG. 5 is a schematic diagram of an example of the present system established in the cabin of an aircraft;

FIG. 6 shows the diagram of FIG. 5 showing an example of the operation of the system established in FIG. 5;

FIG. 7 illustrates schematically an aspect of the disclosure, namely, content of a wireless signal from a wireless sensor; and FIG. 8 illustrates schematically another aspect of the disclosure, namely, content of an RFID tag including information about the object to which the tag is attached and the identity of a wireless sensors on the object.

DETAILED DESCRIPTION

Aspects of the present disclosure are directed to networks of wireless sensors, and to the establishment of wireless sensor networks in which the locations of the sensors are mapped according to the present method.

Referring now to FIGS. 1 and 2, the present system and method maps the location of a wireless sensor 10 in a wireless network within an environment 14 so that a server 18 can identify sensor 10 and respond to wireless electrical signals sent from sensor 10. The term environment means a two-dimensional or three-dimensional space that is the subject of interest as distinguished from space outside environment 14 that is not of interest. Environment 14 has a configuration that includes an arrangement of objects such as object 12. Objects are physical objects, such as walls, floors, windows, and furnishings. The term sensor includes devices that are intended to detect changes in variables such as physical, chemical, electrical, and magnetic changes, and in this case, a wireless sensor, which emits a wireless electro-magnetic signal in response to sensing the change in the variable. The term server refers to a computer server or integrated circuit programmed with firmware or software for receiving and processing electromagnetic signals carrying digital data. Server 18 is associated with a database 22, or memory, that enables server 18 to store and retrieve digital information.

In environment 14, sensor 10 is associated with a tag 26. Tag 26 carries location-related information relevant to an object 12 and also identity information relevant to sensor 10. A reader 30, as seen in FIG. 2, is able to read the information carried on tag 26 and can thus read tag 26 to obtain the location-related information regarding object 12 and the identity information about sensor 10 and then forward that information to a database, such as database 22. The information may be passed via another database 34 that is in communication with database 22 and server 18. Database 34 may be used as a configuration database storing information about the configuration of environment 14, including information about its objects 12 and their locations within environment 14. Sensor 10 and tag 26 may be associated with object 12 in environment 14 if location-related information relevant to object 12 is on tag 26 and when sensor 10 is either physically close to an object 12 or spatially separated from object 12 but a rule relates sensor 10 and object 12 functionally, as will be explained in detail below.

When sensor 10 senses a change, it sends a wireless signal, as indicated schematically in FIG. 2 to server 18. That signal contains the identity of sensor 10 in the form of a media access control (MAC) address in addition to the message 74 or "payload" of the wireless signal, as shown in FIG. 7. The MAC address uniquely identifies sensor 10.

On receipt of the wireless signal by server 20, it accesses database 22 to find identity information in database 22 that corresponds to the MAC address in the message from sensor 10. A MAC address is the identity information associated with a sensor in database 22 and every sensor 10 has its own, unique MAC address. Server 18 then finds the location-related information associated with the identity information of sensor 10. The location-related information relates to the sensor's identity, as given by its MAC address, to the location-related information, which comes from tag 26.

Tag 26 is attached to object 12 in environment 14. It carries, in addition to the MAC address of sensor 10, information about object 12, which may include the so-called birth information 78 about object 12. Birth information 78, as indicated in FIG. 8 includes the manufacturer's identity, part number, part serial number, and date of manufacture. Once server 18 knows this information about object 12, it can reference the configuration to determine where object 12 is located in environment and the location of sensor 10 will be known by inference. Server 18 may then respond to the wireless message from sensor 10 that informed server 18 of a change in a variable. That response may be particular to the location of object 12 in environment 14.

For example, sensor 10 may detect low lubricant levels in connection with a manufacturing process. Perhaps there is a sensor that detects lubricant level in a vessel deployed along a production line required for that manufacturing process. The production line thus defines an environment configured with various machines. Each machine is an object, and conducts one of the processing steps requires lubricant. A signal received by server 18 from sensor 10 near one such machine indicates low levels of lubricant. Server 18 may respond by activating a transfer of lubricant from a lubricant reservoir to vessel. When searching database 22 for location-related information about sensor 10, server 18 identifies tag 26 as being associated with an object—in this example, the vessel —, which has a known location on the production line according to the line's known configuration. The lubricant level sensor may be attached vessel, but the MAC address for the sensor is carried in an RFID tag on the vessel along with location-related information, such as the birth record for the vessel, so the mapping of the physical location of the sensor to the vessel is based on a relationship, namely, that sensor senses a variable important to that production line. Accordingly, sensor 10 sends a wireless message identifying itself by its MAC address that will enable server 18 to associate that MAC address with the location-related information of the RFID tag corresponding to vessel that is low on lubricant, and respond as programmed to the wireless signal received by transferring additional lubricant to the vessel.

If this manufacturing facility has ten lines, sensors are mapped using an RFID scanner to read the tags on the vessel of each line and uploading that information to the configuration database 34 which can be transferred to database 22 where it can be accessed by server 18.

The steps for setting up the present system for mapping a wireless network are shown in FIGS. 3 and 4. Referring now to FIG. 3, first, the environment 14 is defined to be the two- or three-dimensional space that is of interest. Environment 14 is configured, which means that sensors 10 and objects 12 are arranged within environment 14. The configuration information is stored in configuration database 34.

Each sensor 10 has its own media access control (MAC) number so that each sensor 10 has a unique identity and one that is sent by each sensor 10 as part of a wireless message when it reports a change in the variable sensed by a wireless electronic signal. FIG. 7 illustrates such a message which may begin with the MAC address to identify sensor 10 and then the payload of the message follows.

Tags 26 are prepared by encoding location-related information for each object 12 and identity information for each sensor 10 onto tag 26. The location-related information may be birth information particular to object 12 and relates to location because object 12 is assigned a particular location in environment 14, so that information relates to the location of object 12 through the configuration.

Tag 26 is applied to object 12 by attaching it to the surface of object 12 or embedding it in object 12. Sensor 10 may also be attached to object 12 or attached proximate to object 12. Object 12 is installed in environment 14 in accordance with the configuration in configuration database 34. The particular sensor 10 whose identity information has been added to a tag 26 is that sensor attached to or positioned proximate to tag 26.

The location of object 12, or, more precisely, tag 26 on object 12, serves as a proxy for the location of sensor 10, and the location of sensor 10 is therefore be proximate to tag 26. In particular, the position of sensor 10 is the result of a rule that satisfies the requirement that when sensor 10 sends its wireless message to server 18 in response to sensing a change, and server 18 responds to that message, the response addresses the change sensed by sensor 10. In a simple case, if sensor 10 senses that a light switch has been changed from the "off" position to the "on" position, and sends that message to server 18, the light that is turned on by server 18 is the one that is effective to respond to the message from sensor 10 because it illuminates the area proximate to sensor 10. In another example, if sensor 10 senses that a passenger in a seat in an aircraft cabin has summoned a flight attendant by pressing a contact switch, the message sent by sensor 10 may result in a light going on in the galley area of the aircraft identifying the seat where the passenger is sitting. The rule is again satisfied because the response addresses the change sensed by sensor 10, namely, a passenger wanted an attendant and the response notified the attendant.

Tags 26 are read by reader 30 which is configured to read location-related information and identities of sensors 10 from tags 26. FIG. 8 illustrates the content of a tag 26. Tag 26 contains a MAC address for sensor 10 and birth information for object 12. Tags 26 may contain this information in the form of bar coded tags or radio frequency identification (RFID) tags which are both passive devices. The latter respond to a radio frequency signal by emitting a radio-frequency response containing the coded information. RFID tags 26 enable reader 30 to read the coded information without having to be aimed directly at the code on tags 26. Reader sends the information to configuration database 34, which stores the configuration for environment 14.

The information stored on tags 26 is uploaded to on-board database 22 from configuration database 34. Configuration database 34 verifies that the actual configuration of objects matches the configuration design for environment 14. On-board database 22 responds to server 18 once the configuration of environment 14 has been verified.

In FIG. 4, the steps in the operation of the present system in a configured environment 14 are illustrated. Sensor 10 sends a wireless signal in response to a sensed change in a variable. The signal includes the identity of sensor 10 and a message payload as shown in FIG. 7. Server 18 receives the signal and compares the identity of sensor 10 to the sensor identities in on-board database 22 to identify sensor 10 and the object 12 associated with it. The location-related information stored in database 22 in association with the sensor's identity establishes which sensor 10 in environment 14 is the sensor that sent the signal. Server 18 then responds to the message sent by sensor 10 in accordance with its programming.

For example and as illustrated in FIGS. 5 and 6, the interior of an aircraft cabin 38 is defined as an environment and configured with rows 42 of seats 54. To each row 42, an RFID tag 46 is attached and a sensor 50 is attached to each seat 54 in row 42. Sensors 50 may operate overhead lights 58, for example, and, when sensor 50 senses a change—an increase in pressure, a change in capacitance, or movement of a switch from off to on—it sends a signal that turns on an overhead light.

A reader 60 reads RFID tag 46 and sends the results to a configuration database 62 to confirm that the configuration of cabin 38 is proper. Tag 46 contains the birth record for seat row 42 and MAC addresses for each of seats 10A, 10B and 10C in a pre-determined order, such as alphabetically, as shown in FIG. 8. An on-board database 66 receives the information regarding the sensor identity associated with seat 10A and the location-related information from tag 46. When sensor 50 sends a wireless signal, server 70 receives it and extracts the identity of the wireless sensor 50 that sent the message. It accesses onboard database 66 to locate tag 46 associated with sensor 50, and determines sensor 50 is associated with seat 10A in row 42 because its identity is listed alphabetically first in tag 46 of row 42, as shown in FIG. 8. Server 70 therefore activates light 58 which directs light to the area of seat 10A. Sensor 50 may be a button that senses pressure or a change in capacitance or other detectable change caused by the passenger.

Because sensor 10 is wireless, it can be placed close to seat 10A—in the armrest for example rather than overhead near light 58—so that the passenger can easily reach it rather than if it were placed near light 58 where it may require the passenger to unbuckle a seat belt and stand up while the aircraft is in flight. The present system, in this example, thus removes a source of inconvenience for the passenger—and potentially a safety hazard—and also the need for additional wiring to the armrest. The present system would also simplify aircraft construction, reduce weight, and minimize the use of material resources.

In the foregoing example, the interior of the aircraft cabin is an environment, in this case a closed environment. The cabin environment has a configuration, which may include surfaces such as the floor, walls and ceiling and the surfaces of objects such as rows of seats and overhead compartments. A closed environment is not required in the present invention. The environment may be open or partially open. For example, the environment may be a parking lot or parking garage with individual parking meters or parking spaces. The parking lot and parking garage however define a space of interest for placing sensors. Beyond the parking lot and outside the parking garage are of no interest in these environments. The sensors in this example may be motion detectors that sense the presence of cars near parking meters in the parking lot or in parking spaces in a parking garage or sensors that detects whether a particular vehicle is parked in a particular position assigned to it.

Tags in this example may be placed on the floor of a parking space, on the car, or on a parking meter, depending on what the sensor is to measure.

For a computer server to respond to a signal from a wireless sensor that has detected a change, it must know the location of the sensor that sent the signal. If location-related information about that sensor is in a database that can be queried by the server, it can determine that location. A server on the floor of each parking space may be able to tell when the garage is full by the number of sensors sending a "car present" message and the server may respond by illuminating a sign at the garage entrance saying "Parking Lot Full" or, alternatively, messages can be sent from two sensors for each space and one tag on the floor of the space saying whether (1) a car is in the space and (2) there is money inserted in the parking meter.

Variables sensed by sensors may be the position of a switch or button, the temperature, humidity, air pressure, motion, contaminants, radiation, or any other detectable change.

Location-related information is information that can be associated with a location so that location is determined or is readily determinable once the location-related information is known. The information on the RFID tags can be either location information or information that is not strictly location information but relatable to location (i.e., through the known configuration of objects in the environment of interest). It must be information that associates or "maps" the physical assets to their locations. Location-related information may be the location itself or it may be information that, when evaluated in connection with the configuration of an environment, such as a rows of seats in an aircraft passenger cabin or the number of a particular parking space on the third floor of the parking garage, uniquely determines a specific location in the configured environment. Location-related information acts as a proxy for the location of the sensor so that the response to a wireless message from the sensor is relevant to the sensor, as defined by the user.

Relevant to the sensor means that the location identified by the server receiving the wireless message is associated with the sensor that sent the message so that the response by the server is appropriate for the signal received from that sensor. In many examples, the location-related information will be relevant to the sensor if it identifies the location or is in the vicinity of the sensor. In other cases, the connection is based on a rule rather than physical proximity wherein, by following the rule, the response by the server is the appropriate response required by the signal. In the foregoing example of an aircraft cabin, an RFID tag on a row of seats may include a set of MAC numbers, one for each of the seats in the row but a rule is required to know which of the seats carries the sensor that sent the signal. The result depends on the rule that relates the seats to the MAC numbers in the set of numbers carried on the tag for that row. That rule may be that the first MAC number is seat A, the second is seat B, and so on. Seat C may be most proximate to the tag but not be the sensor that sent the signal. If that sensor is the one associated with seat A, the most remote seat to the tag is listed first, the signal carrying that MAC address will result in the light above sear A being illuminated.

In another example, in a multi-story building that has an air handling and conditioning system run by a computer server, there may be an array of sensors attached to the walls of every floor. Some of the sensors sense temperature; others sensors sense humidity or ambient light levels. As the sun passes overhead, shining first on one side of the building and later on the other side, the temperature sensors may sense a change in temperature throughout the day from the external, solar heat through the windows, and perhaps from changes in humidity and from the level of lighting. The air handling system may shift the flow of colder air to favor the warmer side of the building to compensate for the heat loading on that side and perhaps dehumidify the air to achieve a comfort level despite warmer or cooler temperature levels in different parts of the building in order to minimize energy demands for cooling the building. It may also lower ambient light levels on the side of the building receiving the most sun, to further reduce heat and energy loading. These sensors may be located anywhere within an area of a particular floor as long as they are close enough to the area the server is to affect when they sense and report the changes in the ambient conditions because there is sufficient mixing of the air for the micro climate of that area of the environment of the building.

When introducing elements of the present disclosure or exemplary aspects or embodiment(s) thereof, the articles "a," "an," "the" and "said" are intended to mean that there are one or more of the elements. The terms "comprising," "including" and "having" are intended to be inclusive and mean that there may be additional elements other than the listed elements. Although this disclosure has been described with respect to specific embodiments, the details of these embodiments are not to be construed as limitations.

What is claimed is:

1. A system, comprising:
a server configured for receiving and processing digital information and wireless signals;
a database in communication with said server and configured to store and retrieve said digital information received by said server;
a plurality of tags deployed in an environment, a tag of said plurality of tags storing position-related digital information, said tag being a radio frequency identification tags;
a plurality of wireless sensors deployed within said environment, said wireless sensors being in wireless communication with said server, a wireless sensor of said plurality of wireless sensors having an identity which is a media access control address, said identity being stored on said tag in association with said position-related digital information, said wireless sensor being configured to sense a change and to emit a signal upon sensing said change, said server receiving and responding to said signal; and
a machine configured for reading and outputting to said server said position-related digital information and said identity of said wireless sensor on said tag, wherein said server stores said position-related digital information and said identity in said database so that said server associates said wireless sensor with said position-related digital information of said tag and responds to said wireless sensor associated with said tag.

2. The system of claim 1, wherein said environment includes a configuration of objects, said configuration being stored on said database and wherein said tag is deployed in said environment in association with an object of said objects.

3. The system of claim 2, wherein said tag is attached to a first surface in said environment and said wireless sensor is attached to a second surface in said environment.

4. The system of claim 3, wherein said first and second surfaces are on said object.

5. The system of claim 3, wherein said first surface is in spaced relationship with said second surface.

6. The system of claim 3, wherein said first and second surfaces are on a first and a second object of said objects, respectively, and said first and said second objects are in spaced relationship with each other.

7. The system of claim 1, wherein said environment is the interior of a vehicle.

8. The system of claim 7, wherein said vehicle is a passenger aircraft.

9. The system of claim 8, wherein said tags are attached to seats in said passenger aircraft.

10. The system of claim 8, wherein said sensors are attached to seats in said passenger aircraft.

11. The system of claim 1, wherein said tag stores more than one identity.

12. The system of claim 11, wherein said wherein said more than one identity is stored in a preselected arrangement on said tag.

13. The system of claim 12, wherein said more than one identity corresponds to more than one adjacent seat in a row of seats.

14. A method, comprising the steps of:
deploying a plurality of wireless sensors in an environment, a sensor of said plurality of sensors configured to sense a change in said environment and emit a signal related to said change, said sensor having an identity which is a media access control address;
deploying a plurality of machine-readable tags in said environment, a tag of said plurality of tags including location-related digital information and said identity of said sensor so that said identity is associated with said location-related digital information, said tag being a radio frequency identification tag;
reading said tag to obtain said location-related digital information of said tag and said identity of said sensor; and
outputting location-related digital information and said identity read from said tag to a configuration database, wherein said database stores said location-related digital information associated with said identity in said database.

15. The method of claim 14, further comprising the step of configuring an environment containing objects and wireless sensors before deploying said plurality of sensors and said plurality of machine-readable tags to said environment.

16. The method of claim 15, further comprising the step of attaching said machine-readable tags to objects in said environment.

17. A method, comprising the steps of:
providing a configuration for a plurality of objects within an environment;
deploying a plurality of objects into said environment according to said configuration, an object of said plurality of objects carrying a machine-readable radio frequency identification tag having radio frequency identification number;
deploying a plurality of wireless sensors into said environment, a wireless sensor of said plurality of wireless sensors having a media access control address, said wireless sensor being operable to sense a change in said environment proximate to said wireless sensor and emit a signal related to said change;
applying said media access control address to said radio frequency identification tag whereby said media access control address and said radio frequency identification number are associated so as to be readable together;
reading said media access control address and said radio frequency identification number from said radio frequency identification tag; and
transmitting said media access control address and said radio frequency identification number to a processor.

18. The method of claim 17, further comprising the step of storing said media access control address and said radio frequency identification number in a database.

19. The method of claim 17, wherein said environment is the interior of a vehicle.

20. The method of claim 19, wherein said vehicle is a passenger aircraft.

21. The method of claim 20, wherein said radio frequency identification tag is attached to seats in said passenger aircraft.

* * * * *